United States Patent [19]

Sumiyoshi et al.

[11] Patent Number: 4,644,821
[45] Date of Patent: Feb. 24, 1987

[54] CONTINUOUSLY VARIABLE VEHICULAR TRANSMISSION FOR REDUCING TRANSMISSION TORQUE APPLIED TO BELT-TYPE CONTINUOUSLY VARIABLE TRANSMISSION MECHANISM

[75] Inventors: Masaharu Sumiyoshi; Fumio Matsunari, both of Aichi, Japan

[73] Assignee: Kubushiki Kaisha Toyota Chuo Kenkyusho, Japan

[21] Appl. No.: 675,363

[22] Filed: Nov. 27, 1984

[30] Foreign Application Priority Data

Nov. 28, 1983 [JP] Japan .................. 58-223599

[51] Int. Cl.⁴ .................. F16H 11/04; F16H 37/00
[52] U.S. Cl. .................. 74/689; 74/760; 74/763
[58] Field of Search .................. 74/689, 760, 763

[56] References Cited

U.S. PATENT DOCUMENTS

| | | | |
|---|---|---|---|
| 2,049,065 | 7/1936 | Kahn | 74/689 |
| 2,889,716 | 6/1959 | Doty | 74/689 |
| 3,251,243 | 5/1966 | Kress | 74/689 |
| 3,503,279 | 3/1970 | Sievert et al. | 74/689 |
| 3,552,232 | 1/1971 | Kress | 74/689 |
| 3,861,485 | 1/1975 | Busch | 74/689 X |
| 3,877,320 | 4/1975 | Iijima | 74/763 X |
| 3,924,491 | 12/1975 | Kalversberg | 74/763 |
| 4,089,238 | 5/1978 | Forster et al. | 74/763 X |
| 4,328,717 | 5/1982 | Arai | 74/760 |
| 4,402,237 | 9/1983 | Tomlinson | 74/689 |

FOREIGN PATENT DOCUMENTS

| | | | |
|---|---|---|---|
| 2705709 | 8/1978 | Fed. Rep. of Germany | 74/689 |
| 56-49454 | 5/1981 | Japan | 74/689 |
| 56-49457 | 5/1981 | Japan | 74/689 |
| 66557 | 5/1981 | Japan. | |
| 56-49452 | 5/1981 | Japan. | |
| 2054774 | 2/1981 | United Kingdom | 74/689 |
| 1603633 | 11/1981 | United Kingdom | 74/689 |

Primary Examiner—Leslie Braun
Assistant Examiner—Dwight G. Diehl
Attorney, Agent, or Firm—Sughrue, Mion, Zinn, Macpeak and Seas

[57] ABSTRACT

A continuously variable transmission for vehicular use including a torque converter, a CVT (continuously variable transmission mechanism), and a rotation transmission mechanism of a variable ratio having at least reverse and forward low speed ranges of large reduction ratios and a forward high speed range of small reduction ratio and which is equipped with a planetary gear mechanism. A torque transmission passage from the output shaft of the torque converter to the output shaft of the vehicular continuously variable transmission is divided into two torque transmission passages through the CVT and to the rotation transmission mechanism of variable ratio so that, in at least one of the speed positions of large reduction ratios, the torque transmission passage through the CVT is disconnected from the output shaft of the vehicular continuously variable transmission so as to not apply a large torque to the CVT in that case, whereas, in the speed position of small reduction ratio, the torque through the CVT and the torque through the rotation transmission mechanism of variable ratio are applied to the output shaft of the vehicular continuously variable transmission. Accordingly, the torque borne by the CVT is reduced so that it does not exceed the engine torque.

13 Claims, 3 Drawing Figures

CONTINUOUSLY VARIABLE VEHICULAR TRANSMISSION FOR REDUCING TRANSMISSION TORQUE APPLIED TO BELT-TYPE CONTINUOUSLY VARIABLE TRANSMISSION MECHANISM

BACKGROUND OF THE INVENTION

The present invention relates to a continuously variable transmission for a vehicle of a type having a rotation transmission mechanism of variable ratio having at least reverse and forward low speed range of large reduction ratios and a forward high speed range of small reduction ratio and which is equipped with a planetary gear mechanism, a belt-type continuously variable transmission mechanism including an input pulley and an output pulley each having a stationary flange and a movable flange made axially movable with respect to the stationary flange, and rotation transmitting members of an endless belt type running on the two pulleys.

The aforementioned belt-type continuously variable transmission mechanism (referred to below as a "CVT") may be combined with a fluid coupling and a centrifugal clutch or the like thereby to construct a vehicular transmission having a gear ratio varied continuously and over a wide range. A speed ratio $e = N'/N$ of the rotational speed $N'$ of the output shaft of the CVT to the rotational speed $N$ of the input shaft is large during high-speed running of the vehicle but is small for low-speed operation such as when the vehicle is just starting to move. As a result, when the vehicle abruptly comes to a halt after high-speed running, the rotation transmitting member (belt), which is constructed by connecting in the form of an endless belt blocks made to run on the input and output pulleys of the CVT, has a low speed. This makes it impossible to run the belt sufficiently for ensuring the speed ratio e necessary for restarting. As a result, the output torque at restart is so low that the vehicle has poor starting characteristics and poor initial acceleration and experiences acceleration shocks.

To ameliorate these disadvantages, there has been described in Japanese Patent Laid-Open Patent Application No. 56-66557 a system in which a torque converter is interposed between the engine output shaft and the CVT to amplify the engine torque thereby to improve the starting characteristics and initial acceleration. In the aforementioned system, however, a torque several times as high as the engine torque is applied to the CVT when the vehicle first starts to move. This can damage the blocks of the aforementioned belt and the input and output pulleys tend to have a short service life. In order to transmit the aforementioned high torque, moreover, the face pressure between the blocks and the pulleys is raised, making it necessary to provide an oil pump of high capacity.

With a view of improving the operability of the CVT, there has been described in Japanese Patent Laid-Open Patent Application No. 56-49452 an apparatus in which a CVT and a planetary gear mechanism are combined to widen the speed change ratio of the automatic transmission to a width derived by multiplying the speed change ratios of the CVT and the planetary gear mechanism. In this apparatus too there arises a problem similar to the aforementioned in that a torque exceeding the engine torque is applied to the CVT.

SUMMARY OF THE INVENTION

Overcoming the drawbacks of the prior art, the present invention provides a continuously variable transmission for a vehicle, comprising: a torque converter; a CVT; and a rotation transmission mechanism of a variable ratio having at least reverse and forward low speed ranges of large reduction ratios and a forward high speed range of small reduction ratio and which is equipped with a planetary gear mechanism, characterized in that a torque transmission passage from the output shaft of the torque converter to the output shaft of the vehicular continuously variable transmission is divided into two torque transmission passages through the CVT and through the rotation transmission mechanism of variable ratio so that, in at least one of the aforementioned speed positions of large reduction ratio, the torque transmission passage through the CVT is disconnected from the output shaft of the vehicular continuously variable transmission so as to not apply a large torque to the CVT, whereas, in the speed position of small reduction ratio, the torque through the CVT and the torque through the rotation transmission mechanism of variable ratio are applied to the output shaft of the vehicular continuously variable transmission, whereby the torque to be borne by the CVT is so reduced that it does not exceed the engine torque even with the increase in the torque by the torque converter.

More specifically, the continuously variable transmission for a vehicle according to the present invention comprises: a torque converter driven by an engine; an input shaft connected to said torque converter, an output shaft of said vehicular continuously variable transmission; a rotation transmission mechanism of variable ratio including a planetary gear mechanism and a controller for controlling the rotational state of the elements of the planetary gear mechanism, the rotation transmission mechanism having at least reverse and forward low speed ranges of large reduction ratios and a forward high speed range of small reduction ratio; and a belt-type continuously variable transmission mechanism (i.e., CVT) including an input pulley and an output pulley each having a stationary flange and a movable flange axially movable with respect to said stationary flange, and rotation transmitting means of the endless belt type made to run on the two pulleys.

The rotation transmission mechanism of variable ratio is connected to the input shaft and the output shaft so that output power is applied to the output shaft of the vehicular continuously variable transmission at the reduction ratios of the speed positions defined by the planetary gear mechanism of the rotation transmission mechanism of variable ratio. The aforementioned CVT has an input pulley connected to the input shaft and an output pulley provided on a sleeve which is rotatably mounted on the output shaft, and the sleeve of the aforementioned output pulley is enabled to releasably engage with the output shaft of the vehicular continuously variable transmission by clutch means so that the input torque applied to the CVT from the output shaft of the aforementioned fluid converter is transmitted to the output shaft of the vehicular continuously variable transmission only when the aforementioned clutch means is brought into an engagement state.

The aforementioned clutch means is constructed to form a part of the controller of the aforementioned rotation transmission mechanism of variable ratio, and the planetary gear mechanism of the rotation transmission mechanism of variable ratio comes into engagement in the aforementioned speed position of small reduction ratio so that the output torque from the rotation transmission mechanism of variable ratio and the output torque outputted from the CVT are together applied to the output shaft of the vehicular continuously variable transmission to reduce the torque borne by the CVT and so that the planetary gear mechanism of the rotation transmission mechanism of variable ratio is brought out of engagement in one or both the aforementioned speed positions of large reduction ratios, whereby the CVT is disconnected from the output shaft of the vehicular continuously variable transmission so that it is brought into a state bearing no torque.

The aforementioned clutch means can be constructed separately of the controller of the rotation transmission mechanism of variable ratio. The aforementioned torque converter may be suitably implemented as a hydraulic type transmission mechanism, but a fluid coupling can be used as well.

DESCRIPTION OF THE PREFERRED EMBODIMENTS

Figure 1:
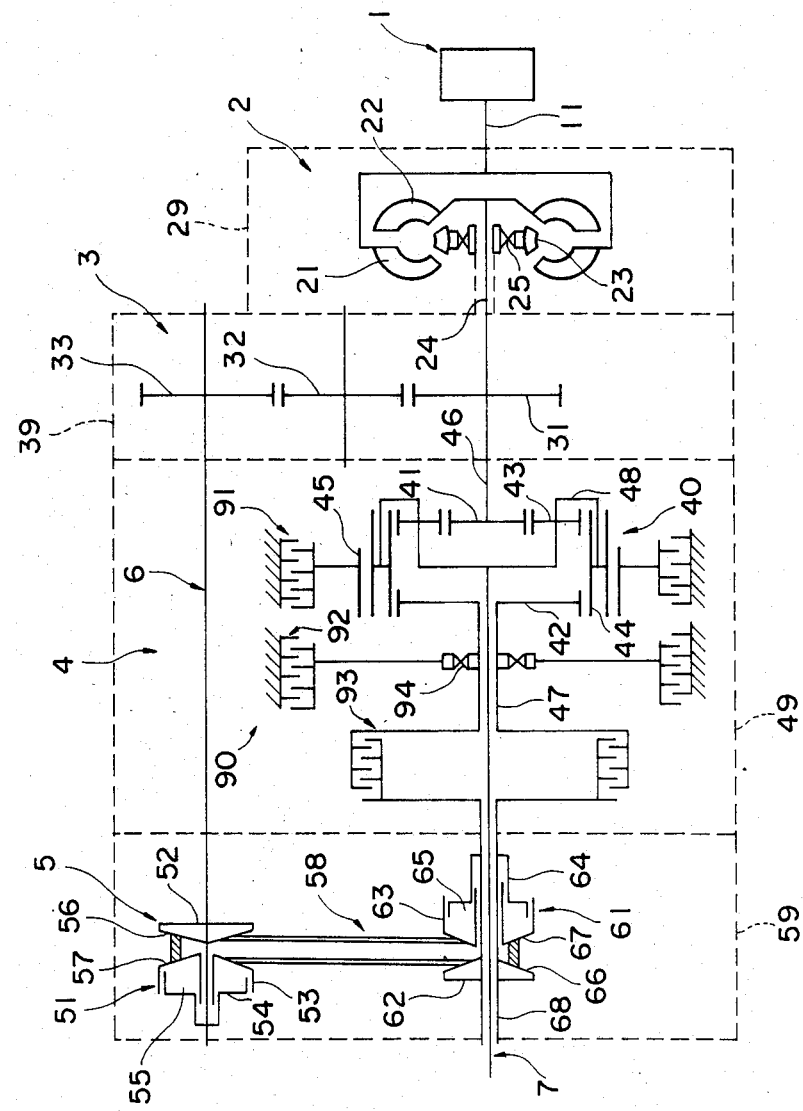
FIGS. 1 to 3 are schematic views showing power transmission mechanisms of first, second and third embodiments of the present invention, respectively.

FIG. 1 shows a power transmission mechanism of a first embodiment, in which the present invention is applied to the transmission of a rear-drive automobile.

The mechanism of present invention comprises an internal combustion engine 1, a torque converter 2, a rotation transmission mechanism 3 of fixed ratio, a rotation transmission mechanism 4 of variable ratio, and a belt-type continuously variable transmission mechanism (CVT) 5.

The torque converter 2 is equipped with a pump impeller 21, a turbine runner 22 and a stator 23, of which the pump impeller 21 is connected to the output shaft 11 of the internal combustion engine 1, the turbine runner 22 is connected to the output shaft 24 of the torque converter 2, and the stator 23 is connected to the housing 29 of the torque converter 2 through a one-way clutch 25.

The fixed-ratio rotation transmission mechanism 3 is composed of an input gear 31, an intermediate gear 32 and an output gear 33 meshing consecutively, of which the input gear 31 is connected coaxially to the output shaft 24 of the aforementioned torque converter 2, the intermediate gear 32 is borne rotatably in the housing 39 of the fixed ratio rotation transmission mechanism 3, and the output gear 33 is fixed concentrically to a later-described intermediate shaft 6 so that the rotation of the output shaft 24 of the torque converter 2 is transmitted to the intermediate shaft 6 by way of the input gear 31, the intermediate gear 32 and the output gear 33 in the recited order. The gears 31, 32 and 33 are preferably helical gears from the standpoint of noise reduction.

The variable ratio rotation transmission mechanism 4 is equipped with a Ravegnaux-type planetary gear mechanism 40 and a control mechanism 90 composed of a first brake 91, a second brake 92 and a clutch 93. The Ravegnaux-type planetary gear mechanism 40 is composed of a first sun gear 41, a second sun gear 42, a first planetary pinion 43 meshing with the first sun gear 41, a second planetary pinion 44 meshing with both the first planetary pinion 43 and the second sun gear 42, and a ring gear 45 meshing with the second planetary pinion 44, of which the first sun gear 41 is fixed coaxially to the input shaft 46 of the planetary gear mechanism 40, the second sun gear 42 is fixed coaxially to a sleeve 47 which is fitted rotatably on the output shaft 7 of the aforementioned transmission; and the aforementioned first and second planetary pinions 43 and 44 are borne rotatably on a carrier 48 which is fixed to the transmission output shaft 7.

The planetary gear mechanism 40 is accommodated in the housing 49 of the variable ratio rotation transmission mechanism 4, the first brake 91 is so mounted in the inner wall of the housing 49 that the aforementioned ring gear 45 is retained in or made rotatable with respect to the housing 49, the second brake 92 is so mounted in the inner wall of the housing 49 that the sleeve 47 is retained in or made rotatable with respect to the housing 49 through a one-way clutch 94 for blocking the reverse rotation of the second sun gear 42 and the input shaft 46 of the sleeve 47, and the clutch 93 is so interposed between the sleeves 47 and 68 that the sleeve 47 may either rotate integrally with the sleeve 68 of a later-described driven pulley 61 of the CVT 5 or be made freely rotatable.

The aforementioned CVT 5 is composed of an input pulley 51, the output pulley 61, and a belt 58 which runs between the two pulleys and which is constructed by connecting blocks having a V-shape or trapezoidal cross-section in the form of an endless band. The aforementioned input pulley 51 is composed of a stationary flange 52 fixed concentrically to the intermediate shaft 6, a movable flange 53 movable axially of the intermediate shaft 6, a support member 54 fixed to the intermediate shaft 6, and a hydraulic actuator 55 formed in a liquid-tight manner between the movable flange 53 and the support member 54, of which the axially opposite faces of the fixed and movable flanges 52 and 53 are formed, respectively, with slopes 56 and 57 which open radially. The output pulley 61 is composed of a stationary flange 62 fixed coaxially to the sleeve 68 which is fitted rotatably on the output shaft 7, a movable flange 63 made movable axially of the sleeve 68, a support member 64 fixed to the sleeve 68, and a hydraulic actuator 65 interposed in a liquid-tight manner between the movable flange 63 and the support member 64, of which the axially opposite faces of the stationary and movable flanges 62 and 63 are formed, respectively, with slopes 66 and 67 which open radially. The angle between the slopes 66 and 67 formed on the respective flanges 62 and 63 of that driven pulley 61 is equal to both that between the slopes 56 and 57 formed on the respective flanges 52 and 53 of the aforementioned drive pulley 51 and that between the two sloped sides of the section of the belt 58.

The intermediate shaft 6 extends through the housing 49 of the variable ratio rotation transmission mechanism 4 and has one end borne rotatably in the housing 39 of the fixed ratio rotation transmission mechanism 3 and the other end borne in the housing 59 of the CVT 5. On the other hand, the sleeve 68 of the driven pulley 61 of the CVT 5 is borne rotatably in the housing 59 of the CVT 5.

Both the cylinder chambers of the first brake 91, the second brake 92 and the clutch 93 of the variable ratio rotation transmission mechanism 4 and the hydraulic actuators 55 and 65 of the CVT 5 are formed with oil passages extending from an oil pressure control circuit (not shown) so that the working fluid (oil) under line pressure is distributed among them. The oil pressure control circuit is equipped with an oil bath, a pump, an oil pressure control valve, a manually operated valve, etc., all of which normally form a part of the oil pressure control circuit of an ordinary automatic transmission. The manually operated valve distributes the oil, which is discharged from the pump and controlled to the line pressure by the oil pressure control valve, among the cylinder chambers of the first brake 91, the second brake 92 and the clutch 93, respectively, in the three positions—a reverse position R, a forward low speed range L and a forward high speed range H of the ranges of the manually operated valve, as indicated in Table 1, thereby to establish the gear trains of the respective reverse, forward lower-speed and forward higher-speed ranges R, L and H in the variable ratio rotation transmission mechanism 4.

TABLE 1

| Ranges of Manual Valve | | 91 | 92 | 93 | 94 |
|---|---|---|---|---|---|
| Reverse R | | 0 | — | — | |
| Forward | Lower L | — | 0 | — | * |
| | Higher H | — | — | 0 | |

In Table 1, "0" designates the state in which the oil under pressure is supplied so that the brakes or clutch are applied, and "—" designates the state in which no oil is supplied so that the brakes or clutch are released. The range in which the one-way clutch 94 operates is designated by "*".

In the embodiment thus far described, if the manually operated valve is positioned in the reverse range (R), the line pressure oil is distributed to the cylinder chamber of the first brake 91, as indicated in Table 1, to bring the brake 91 into engagement while the second brake 92 and the clutch 93 are out of engagement. As a result, the output torque of the torque converter 2 connected to the output shaft 11 of the internal combustion engine 1 is transmitted partly via the fixed ratio rotation transmission mechanism 3, the intermediate shaft 6 and the CVT 5 to the sleeve 68 of the drive pulley 61 of the CVT 5, and partly from the input shaft 46 of the variable ratio rotation transmission mechanism 4 via the gear train of the Ravegnaux-type planetary gear mechanism 40 to the output shaft 7. Since the aforementioned clutch 93 is in its released state, however, the sleeve 68 of the CVT 5 rotates idly on the output shaft 7 so that it does not transmit that output torque of the torque converter 2 which has been transmitted to the CVT 5 to the output shaft 7. In the planetary gear mechanism 40 of the variable ratio rotation transmission mechanism 4, moreover, since the first brake 91 is applied to stop the ring gear 45, the first and secondary planetary pinions 43 and 44 act as double-planet planetary gears, which reversely rotate the carrier 48, while meshing with each other, to rotate the output shaft 7 in the direction opposite to the input shaft 46, although the first sun gear 41 connected to the input shaft 46 rotates forwardly. Hence, with the numbers of the teeth of the first sun gear 41 and the ring gear 45 designated by S1 and R, respectively, and the rotational speeds of the first sun gear 41 and the carrier 48 by NS1 and NC, respectively, the speed ratio (i.e., NC/NS1) is expressed, as follows:

$$ND/NS1 = 1\left(1 - \frac{R}{S1}\right), \text{ where } R > S1.$$

Next, in Table 1, as the manually operated valve is positioned in the forward lower-speed (L) range, the oil under line pressure is supplied to the cylinder chamber of the second brake 92 to apply the brake 92 and the first brake 91 and the clutch 93 are released. As a result, as in the reverse (R) range, the sleeve 68 of the CVT 5 is caused to rotate idly on the output shaft 7 so that no torque is transmitted from the CVT 5 to the sleeve 47 and the second sun gear 42. In the planetary gear mechanism 40, moreover, the first brake 91 is released so that the ring gear 45 becomes independent of the torque of the first sun gear 41. Since the second brake 92 is applied, on the contrary, the aforementioned sleeve 47 and the second sun gear 42 fixed to the sleeve 47 are caused to stop their opposite rotations through the one-way clutch 94 with respect to the housing 49 so that the carrier 48 is rotated in the same direction as the input shaft to transmit the torque to the output shaft 7 by the engaging relationship between the second planetary pinion 44, which is in meshing engagement with the aforementioned stopped second sun gear 42, and the first planetary pinion 43, which is in meshing engagement with the first sun gear 41. If the number of the teeth of the second sun gear 42 is designated by S2, the speed ratio (i.e., NC/NS1) at this time is expressed as follows:

$$ND/NS1 = 1/\left(1 + \frac{S2}{S1}\right).$$

If the manually operated valve is positioned in the forward higher-speed (H) range, on the other hand, the line pressure oil is supplied to the cylinder chamber of the clutch 93, as indicated in Table 1, to apply the clutch 93 but release the first brake 91 and the second brake 92. As a result, since the sleeve 68 of the driven pulley 61 of the CVT 5 is connected to the sleeve 47 of the planetary gear mechanism 40 and since both the first and second brakes 91 and 92 of the planetary gear mechanism 40 are in their released states, the planetary gear mechanism 40 adds the torque which has been transmitted via the CVT 5 to the second sun gear 42 and the torque which has been transmitted from the input shaft 46 to the first sun gear 41 and outputs the summed torque from the carrier 48 to the output shaft 7. At this time, if the rotational speed transmitted from the output shaft 24 of the torque converter 2 via the fixed ratio rotation transmission mechanism 4, the intermediate shaft 6 and the CVT 5 to the second sun gear 42 is designated by NS2, and the rotational speed ratio of the input pulley 51 and the output pulley 61 of the CVT 5 by e, and if the speed ratio of the fixed ratio rotation transmission mechanism 4 is designated by k, the speed ratio NC/NS1 is expressed as follows:

$$ND/NS1 = 1\left(1 + e \cdot k \cdot \frac{S2}{S1}\right) / \left(1 + \frac{S2}{S1}\right).$$

Hence, if the the servo-motor 65 of the output pulley 61 of the CVT 5 is supplied with oil under line pressure at all times and if the value of the rotational speed ratio e between the input and output pulleys 51 and 61 is controlled to vary continuously within the range of 0.5 to 2 at around 1, for example, by controlling the pressure of the oil which is supplied to the servo-motor 55 of the input pulley 51 so that it increases or decreases in accordance with the throttle opening of the internal combustion engine 1, the rotational speed of the intermediate shaft 6, the running speed of the vehicle, etc., and the rotational speed of the output shaft 7 can also be continuously varied in accordance with a set value equal to the tooth number ratio S2/S1 between the first and second sun gears 41 and 42.

In the description thus far made, the fixed ratio rotation transmission mechanism 3 and the CVT 5 have been described separately of each other. Since, however, the fixed ratio rotation transmission mechanism 3 applies the output torque of the torque converter 2 not through the variable ratio rotation transmission mechanism 4 but through the intermediate shaft 6 to the input pulley 51 of the CVT 5, the fixed ratio rotation transmission mechanism 3 and the intermediate shaft 6 can be provided at the input side of the CVT 5 if desired.

As is apparent from the foregoing description, the output torque of the torque converter 2 is divided into two—the torque transmitted to the output shaft 7 through the variable ratio rotation transmission mechanism 4 and the torque transmitted to the sleeve 68 arranged coaxially and rotatably on the output shaft 7 so that, in the state where a high engine torque is applied to the transmission mechanism, as in the reverse (R) range or in the forward lower-speed (L) range, the output torque is transmitted to the output shaft 7 only through the variable ratio rotation transmission mechanism 4 by separating the CVT 5 from the torque transmission passage, whereas, in the normal running range, the torques to be transmitted to the CVT 5 and the variable ratio rotation transmission mechanism 4 are summed and transmitted to the output shaft 7. Accordingly, the load of the torque upon the CVT 5 is lightened.

Figure 2:
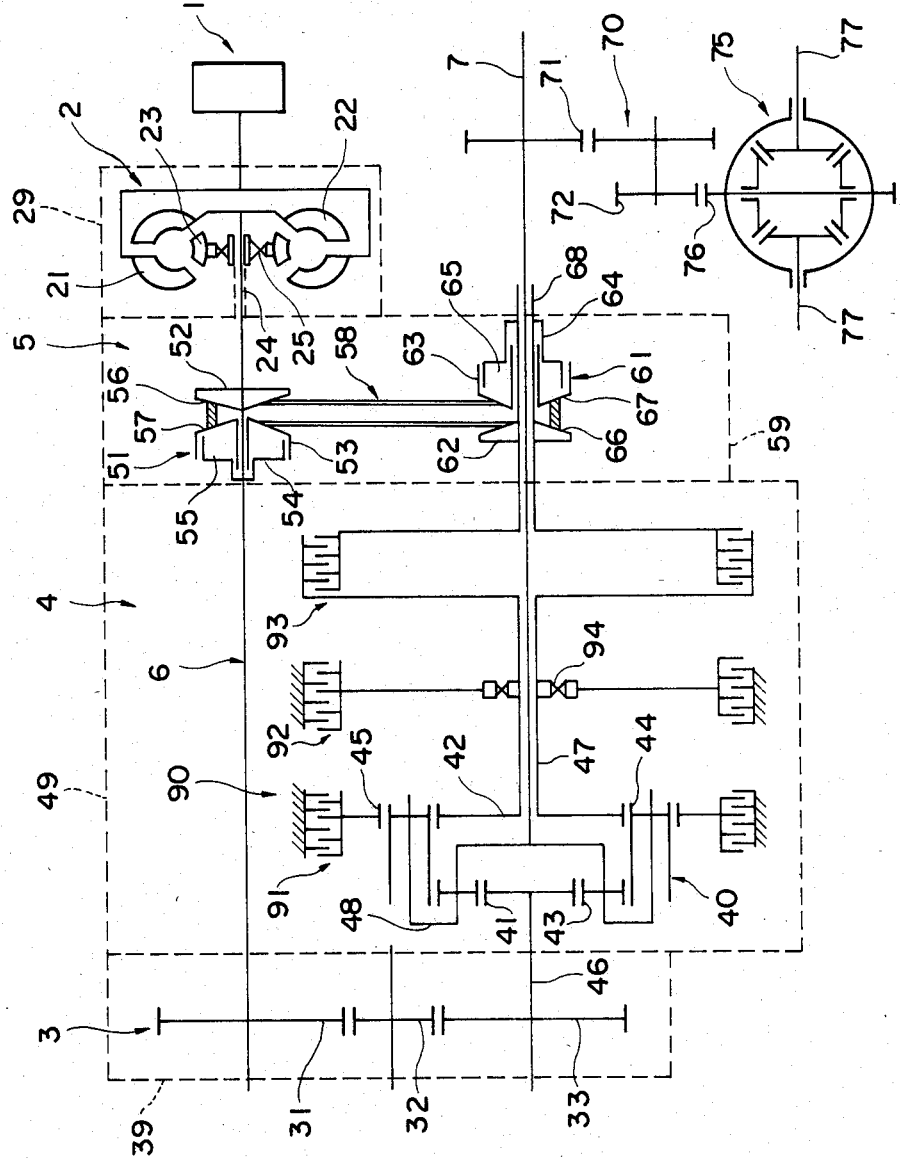

FIG. 2 shows a power transmission mechanism of a second embodiment in which the present invention is applied to a transmission of a transverse-engine front-drive automobile. This embodiment differs from the aforementioned first embodiment in that the intermediate shaft 61 is connected to the output shaft 24 of the torque converter 2, in that the CVT 5 has its input pulley 51 arranged on the aforementioned output shaft 24 and its stationary flange 52 fixed on the output shaft 24, in that the output gear 33 of the fixed ratio rotation transmission mechanism 3 has its input gear 31 fixed to the intermediate shaft 61 is fixed to the input shaft 46 of the Ravegnaux-type planetary gear mechanism 40 of the variable ratio rotation transmission mechanism 4, and in that the output shaft 7 to which the carrier 48 of the Ravegnaux-type planetary gear mechanism 40 is fixed is arranged parallel to the output shaft 24 of the torque converter 2. The output gear 72 of a reduction gear mechanism 70 having its input gear 71 fixed to the aforementioned output shaft 7 meshes with the input gear 76 of a differential gear mechanism 75 thereby to provide a mechanism for driving front axles 77 and 77. Since the remaining construction of the second embodiment is the same as that of the first embodiment, like elements are indicated the same reference numerals, and their explanations are omitted.

According to the present invention, it is apparent that the output torque of the torque converter 2 is divided into two parts—the torque transmitted to the output shaft 7 through the intermediate shaft 61, the fixed ratio rotation transmission mechanism 3 and the Ravegnaux-type planetary gear mechanism 40 of the variable ratio rotation transmission mechanism 4, and the troque transmitted through the CVT 5 to the sleeve 68 arranged coaxially and rotatably on the output shaft 7 so that the pressure oil is distributed, as indicated in Table 1, among the first brake 91, the second brake 92 and the clutch 93 by the manually operated valve to disconnect the CVT 5 from the torque transmission passage when a high engine torque is applied to the transmission mechanism as in the reverse (R) range or the forward lower-speed (L) range as in the first embodiment, but to sum and apply the torques, which are transmitted to the CVT 5 and the variable ratio rotation transmission mechanism 4, to the output shaft 7 when in the forward higher-speed (H) range to then lighten the load of the torque upon the CVT 5. Moreover, the reduction ratios in the aforementioned respective ranges are identical to those in the respective ranges of the aforementioned first embodiment. Further, in the present embodiment, the intermediate shaft 61 and the fixed ratio rotation transmission mechanism 3 may be provided at the input side of the variable ratio rotation transmission mechanism 3.

In the second embodiment, assuming that the numbers of the teeth of the ring gear 45, the first sun gear 41, the second sun gear 42, the first planetary pinion 43 and the second planetary pinion 44 of the Ravegnaux-type planetary gear mechanism 40 are 79, 28, 35, 20 and 22, respectively, that the speed change ratio k of the fixed ratio rotation transmission mechanism 3 is 1, and that the speed change ratio e of the CVT 5 is within a range of 0.5 to 2.0, the reduction ratios and torque ratios of the output shaft 7 to the output shaft 24 of the torque converter 2 in the reverse (R) range, the forward lower-speed (L) range and the forward higher-speed (H) range, respectively, are as shown in Table 2:

TABLE 2

| Range | | Reduction Ratio | Torque Ratio |
|---|---|---|---|
| Reverse R | | 1/1.82 = 0.549 | 1.82 |
| Forward | Lower L | 1/2.25 = 0.444 | 2.25 |
| | Higher H | 0.723 to 1.555 | 1.384 to 0.643 |

The share of the torque between the first sun gear 41 and the second gun 42 is at a ratio of 28:35 of the output torque, and the torque exerted upon the CVT 5 is calculated from that ratio as indicated in Table 3:

TABLE 3

| CVT Torque Ratio (1/e) | 0.50 | 0.75 | 1.00 | 1.50 | 2.00 |
|---|---|---|---|---|---|
| Total Torque Ratio | 0.643 | 0.844 | 1.000 | 1.227 | 1.384 |
| Torque of 1st Sun Gear | 0.357 | 0.469 | 0.556 | 0.682 | 0.769 |
| CVT Input Torque | 0.714 | 0.625 | 0.556 | 0.455 | 0.385 |

On the other hand, if the tooth number ratio of the reduction gear mechanism 70 is 43:48 while the tooth number ratio of the differential gear mechanism 75 is 70:19, the ratio of the differential gear mechanism output torque to the torque converter output torque is 7.485 in the reverse (R) range, 9.253 in the forward lower-speed (L) range, and 5.692 to 2.644 in the forward higher-speed (H) range.

As has been described hereinbefore, it is apparent that the speed ratios required of the vehicular transmission are satisfied by the combination of the torque converter, the planetary gear mechanism and the CVT.

In designing a continuously variable transmission for vehicular use, it is required to consider the layout of parts and the required assembly operations, as well as the size and weights of the parts. The transmission of the second embodiment thus far described has the following advantages when it is implemented for a front-drive automobile (i.e., a so-called "FF car"):

(i) The transmission is made compact by using a gear with an idler as the fixed ratio rotation transmission mechanism.

(ii) If a toothed belt is used as the fixed ratio rotation transmission member and is arranged in a housing, the assembly of the tooth belt is accompanied by some difficulty. The assembly is, however, facilitated by using the gear with an idler as the fixed ratio rotation transmission means and by displacing it to one end (i.e., to the lefthand end of the drawing) of the housing, as shown in FIG. 2.

(iii) The overall length of the transmission can be made shorter because it is dominated only by the arrangement of the shafts and by the arrangement of the Ravegnaux-type planetary gear mechanism and the various actuators.

(iv) The housings can be die-cast.

(v) The torque to be transmitted to the CVT in the forward higher-speed (H) range is 71.4% or less by setting the tooth number of the Ravegnaux-type planetary gear mechanism at the above-specified values.

It should be understood that the exact values of the respective several dimensions mentioned in the foregoing do not limit the present invention but represent only examples for practicing the invention.

Figure 3:
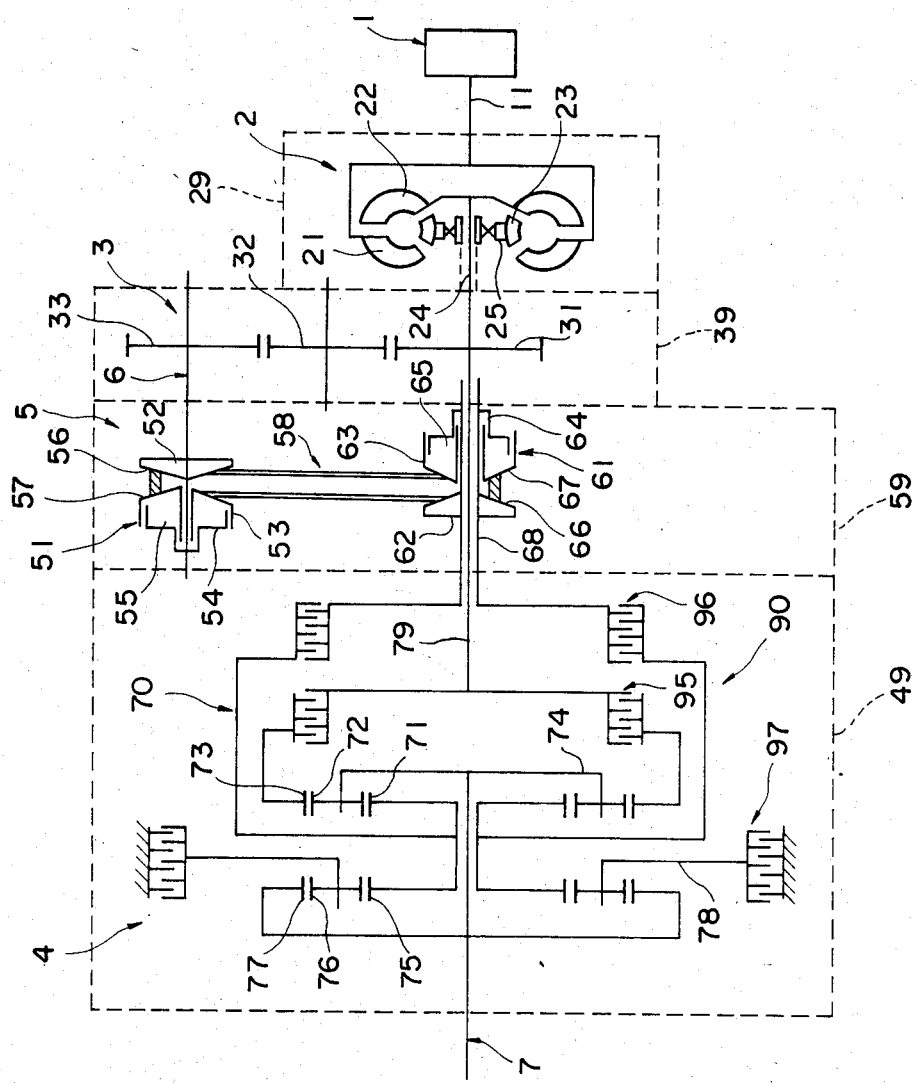

FIG. 3 shows a power transmission mechanism of a third embodiment, in which a Simpson-type planetary gear mechanism 70 is employed as the planetary gear mechanism of the variable ratio rotation transmission mechanism 4 and which is applied to the transmission of a front-engine rear-drive automobile. The same elements as those used in the above-described embodiments are indicated by the same reference numerals, and their explanations are omitted.

The Simpson-type planetary gear mechanism 70 is constructed of a planetary gear train which is composed of the first sun gear 71, the first planetary pinion 72 meshing with the sun gear 71, a first ring gear 73 meshing with the planetary pinion 72, and a first carrier 74 bearing rotatably the first planetary gear 72, and a planetary gear train which is composed of the second sun gear 75, the secondary planetary pinion 76 meshing with the sun gear 75, the second ring gear 77 meshing with the planetary pinion 76, and a second carrier 78 bearing rotatably the second planetary pinion 76. Of these, the first sun gear 71 and the second sun gear 74 are connected integrally to each other so that they can rotate coaxially with the output shaft 7, the first carrier 74 and the second ring gear 77 are fixed to the output shaft 7, the first and second sun gears 71 and 75 are releasably connected to the flange 68 of the output pulley 61 of the CVT 5 by a second clutch 96, the first ring gear 73 is releasably connected to the input shaft 79 of the planetary ger mechanism 70 by a first clutch 95, and the output shaft 79 is fitted and borne rotatably in the aforementioned flange 68. Moreover, their mechanism is borne in the housing 49 of the variable ratio rotation transmission mechanism 4 by the aforementioned flange 47 and output shaft 7.

In the third embodiment thus far described, the output shaft 24 of the torque converter 2 is connected to the input gear 31 of the fixed ratio rotation transmission mechanism 3 and to the input shaft 79 of the Simpson-type planetary gear mechanism 70, the intermediate shaft 6 arranged with the input pulley 51 of the CVT 5 is connected to the output gear 33 of the fixed ratio rotation transmission mechanism 3, and the output pulley 61 of the CVT 5 is borne on the input shaft 79 of the planetary gear mechanism 70 by the flange 68 thereof at an intermediate position between the fixed ratio rotation transmission mechanism 3 and the variable ratio rotation transmission mechanism 4.

The pressure oil is distributed through the manually operated valve of the oil pressure control circuit as in the first embodiment and as indicated in Table 4 among both the cylinder chambers of the first clutch 95, the second clutch 96 and the brake 97, which together form the control mechanism 90 of the variable ratio rotation transmission mechanism 4, and the hydraulic actuators 55 and 65 of the CVT, thereby to establish the gear trains of the respective reverse R, forward lower-speed L and forward higher-speed H ranges.

TABLE 4

| Manual Valve Range | | 95 | 96 | 97 |
|---|---|---|---|---|
| Reverse R | | — | 0 | 0 |
| Forward | Lower L | 0 | — | 0 |
| | Higher H | 0 | 0 | — |

The symbols "0" and "—" in the above Table 4 designate the applied state and the released state, respectively.

In the third embodiment, if the manually operated valve is positioned in the reverse (R) range, the second clutch 96 and the brake 97 are applied and the first clutch 95 is released, as shown in Table 4. As a result, in the Simpson-type planetary gear mechanism 70, the second carrier 78 is fixed to the housing 49, and the second sun gear 75 and the first sun gear 71 are connected to the sleeve 68 of the CVT 5. Since the first clutch 95 is in its released state, however, the torque, which has been transmitted to the input shaft 79 of the planetary gear mechanism 70 connected to the output shaft 24 of the torque converter 2, is not inputted to the planetary gear mechanism 70. As a result, the second ring gear 77 is rotated in the direction opposite to that of the gear 75 by the second sun gear 75 so that the output shaft 7 is rotated in the direction opposite that of the output shaft 24 of the torque converter 2. Here, if it is assumed that the numbers of teeth of the second sun gear 75 and the second ring gear 77 and S2 and R2, respectively, and the rotational speeds of the second sun gear 75 and the second ring gear 77 are NS2 and NR2, respectively, the speed ratio (i.e., NR2/NS2) of the Simpson-type planetary gear mechanism 70 is expressed as follows:

NR2/NS2=S2/R2.

Since, moreover, rotational motion is transmitted from the output shaft 24 of the torque converter 2 to the second sun gear 75 of the planetary gear mechanism 70 through the fixed ratio rotation transmission mechanism 3 (of the speed ratio k) and the CVT 5 (having the speed ratio e), the speed ratio (i.e., NR2/NT) of the transmission mechanism is expressed, as follows (assuming the rotational speed of the output shaft 24 of the torque converter 2 is designated by NT):

$$NR2/NT = k \cdot e \cdot (S2/R2).$$

If the manually operated valve is then positioned in the forward lower-speed (L) range, the first clutch 95 and the brake 97 are applied, but the second clutch 96 is released. As a result, the input shaft 79 of the Simpson-type planetary gear mechanism 70 is connected to the first ring gear 73, and the second carrier 78 is fixed to the housing 49. Hence, the following relationships hold, assuming that the tooth numbers of the first sun gear 71 and the first ring gear 73 are designated by S1 and R1, respectively, the rotational speeds of the first sun gear 71, the first carrier 74 and the first ring gear 73 are designated by NS1, NC1 and NR1, respectively, and the rotational speed of the second carrier 2 is designated by NC2:

$$NR1 \cdot R1 + NS1 \cdot S1 = NC1(R1 + S1);$$

and $$NR2 \cdot R2 + NS2 \cdot S2 = NC2(R2 + S2).$$

At the same time, since the first sun gear 71 and the second sun gear 75 are connected integrally to each other, since the first carrier 74 and the second ring gear 77 are connected by the output shaft 7, and since the second carrier 78 is fixed to the housing 49 by the brake 97, the following relationships hold:

$$NS1 = NS2,$$

$$NC1 = NR2,$$

and $$NC2 = 0,$$

so that the speed ratio (i.e., NR2/NR1) assumes a large value as is expressed by the following equation:

$$NR2/NR1 = \frac{R1}{R1 + S1 + \frac{R2}{S2} \cdot S1}.$$

Since the second clutch 96 is in its released state, moreover, the sleeve 68 of the output pulley 61 of the CVT 5 rotates freely with respect to the input shaft 79 so that the output torque, which is transmitted from the output shaft 24 of the torque converter 2 through the fixed ratio rotation transmission mechanism 3 to the CVT 5, is not further transmitted to the output shaft 7.

When the manually operated valve is positioned in the forward higher-speed (H) range, the first clutch 95 and the second clutch 96 are applied, but the brake 97 is released. As a result, the output torque of the torque converter 2 is divided into a torque applied from the output shaft 24 through the fixed ratio rotation transmission mechanism 3 and the CVT 5 to the second sun gear 75 (which is outputted from the second ring gear 78) and a torque inputted to the first ring gear 73 and the first sun gear 71 and outputted from the first carrier 74, and the output torques, which are outputted from the second ring gear 78 and the first carrier 74 are summed at the output shaft 7. If the reduction ratio in this state is taken into consideration, the following relationship holds in the planetary gear train composed of the first sun gear 71, the first planetary pinion 72, the first ring gear 73 and the first carrier 74:

$$NR1 \cdot R1 + NS1 \cdot S1 = NC1(R1 + S1).$$

Since the first sun gear 71 and the second sun gear 75 are connected integrally to each other and since the first carrier 74 and the second ring 77 are connected to the output shaft 7, the following relationships hold, as has been described hereinbefore:

$$NS1 = NS2,$$

and $$NC1 = NR2.$$

If, moreover, assuming that the rotational speed ratio between the input pulley 51 and the output pulley 61 of the CVT 5 is designated by e and the reduction ratio of the fixed ratio rotation transmission mechanism 4 is designated by k, the following relationship holds:

$$e = NS2/k \cdot NR1.$$

On the other hand, the rotational speed NT of the output shaft 24 of the torque converter 2 is expressed as follows, because it is equal to the rotational speed of the first ring gear 73:

$$NT = NR1.$$

Hence, the reduction ratio (i.e., NR2/NT) of the transmission mechanism can be expressed, as follows:

$$\frac{NR2}{NT} = \frac{NR2}{NR1} = \frac{R1 + e \cdot k \cdot S1}{R1 + S1}.$$

If, therefore, the pressure of the oil supplied to the respective hydraulic actuators 65 and 55 of the output pulley 61 and the input pulley 51 of the CVT 5 is controlled to continuously vary the aforementioned rotational speed ratio e as has been described hereinbefore, the rotational speed of the output shaft 7 is continuously varied in accordance with the set values of the tooth numbers S1 and R1 of the first sun gear 71 and the first ring 73.

In the present embodiment too, as has been described in connection with the first embodiment, the fixed ratio rotation transmission mechanism 3 and the intermediate shaft 6 are provided only for transmitting the output torque of the torque converter 2 to the input pulley 51 of the CVT 5, and thus may be provided at the input side of the CVT 5.

As is apparent from the above description, the output torque of the torque converter 2 is divided into two parts—the torque transmitted to the output shaft 7 through the Simpson-type planetary gear mechanism 70 of the variable ratio rotation transmission mechanism 4 and the torque transmitted through the CVT 5 to the sleeve 68, which is arranged coaxially and rotatably on the input shaft 79 of the aforementioned planetary gear mechanism 70. So, the torques are outputted to the output shaft 7 only through the variable ratio rotation transmission mechanism 4 by disconnecting the CVT 5 from the torque transmission passage in the state where a high engine torque is applied to the transmission mechanism as in the forward lower-speed (L) range and the torque transmitted through the Simpson-type planetary gear mechanism 70 and the torque to be transmitted through the CVT 5 are summed when the output shaft 7 rotated at a high speed to lighten the load of the torque upon the CVT 5.

In order to achieve the speed positions of the reverse (R) range, forward lower-speed (L) range and forward higher-speed (H) range, the oil pressure control circuit used in the aforementioned embodiments and containing the manually operated valve distributes the pressurized oil to the single hydraulic actuator at each speed positions in the first and second embodiments and distributes the oil to the two hydraulic actuators at each speed position in the third embodiment. The way in which the pressurized oil is distributed is well known for a vehicular automatic transmission composed of a torque converter and the planetary gear mechanism in combination, and the necessary pressure generating device such as the oil pump in the oil pressure control circuit, the line pressure control device, and the pressure reducing or accumulating device are also well known in the art.

Although the hydraulic type rotation transmission mechanism of the invention has been exemplified by a torque in the above description, a fluid coupling having no torque amplifying means can be used as well.

The invention as described above provides a variable ratio rotation transmission mechanism including a planetary gear mechanism and a controller for controlling the rotational states of the various elements of this mechanism and having at least reverse and forward low speed ranges of large reduction ratios and forward high speed range of small reduction ratio, and a belt type continuously variable transmission mechanism (i.e., CVT) including an input pulley, an output pulley and an endless belt type rotation transmission means. The input shaft of the aforementioned planetary gear mechanism and the input pulley of the CVT are connected in parallel with the output shaft of the hydraulic rotation transmission mechanism so that the torque transmitted from the output shaft of the hydraulic rotation transmission mechanism to the output shaft of the vehicular continuously variable transmission is divided into two parts—one transmitted along the torque transmission passage extending through the variable ratio rotation transmission mechanism and the other transmitted along the torque transmission passage extending through the aforementioned CVT. The output pulley of the CVT is provided on the sleeve which is fitted rotatably and coaxially on the output shaft of the vehicular continuously variable transmission. Clutch means is provided for releasably connecting the sleeve and the output shaft of the vehicular continuously variable transmission. When the planetary gear mechanism is in one or both of the reverse and forward low speed ranges of large reduction ratio, the torque transmission passage extending throught the CVT is disconnected from the output shaft of the vehicular continuously variable transmission by releasing the clutch means to thus not apply the high torque to the CVT but to output only the torque through the planetary gear mechanism, whereas, when the planetary gear mechanism is in the speed position of small reduction ratio, the torque transmission passage through the CVT is connected to the output shaft of the vehicular continuously variable transmission by applying the clutch means to thus sum the aforementioned torque and the torque outputted through the planetary gear mechanism of the variable ratio rotation transmission mechanism.

As a result, when the variable ratio rotation transmission mechanism is in at least one of the reverse and foward slow speed ranges of large reduction ratios so that the torque is amplified and outputted, the CVT is brought into a state in which it can rotate freely without any torque applied thereto so that it does not receive such a force as would cause damage. When the variable ratio rotation transmission mechanism is in the forward high speed range of small reduction ratio, on the other hand, the output torques outputted from both the torque transmission passage through the CVT and the torque transmission passage through the planetary gear mechanism are summed at the output shaft of the vehicular continuously variable transmission so that the output shaft outputs the torque according to the speed ratio e of the CVT and so that the CVT does not receive any large torque exceeding the engine torque even in the running operation accompanied by an increase in the torque by the torque converter, thereby reducing the torque load.

In the present invention, moreover, when the aforementioned clutch is used commonly with the clutch which forms a part of the controller of the aforementioned variable ratio rotation transmission mechanism and which is adapted to be applied in the forward high speed range and to be released in the reverse or forward low speed range, it is unnecessary to provide another clutch.

As has been described in detail hereinbefore, the vehicular continuously variable transmission of the present invention overcomes the disadvantages of conventional torque converters and CVTs while making effective use of their advantages. Features of the invention include:

(i) When the planetary gear mechanism of the variable ratio rotation transmission mechanism is in at least the forward low speed range of large reduction ratio, the clutch means is released to effect no torque transmission to the output shaft by the CVT. As a result, possible problems such as slip and acceleration shocks of the pulley of the CVT when the vehicle starts after an abrupt stop are eliminated.

(ii) Torque transmission by the CVT is not effected in the aforementioned forward low speed range. As a result, in addition to the foregoing feature (i), no abrupt fluctuation of the pulley for the abrupt speed change at the start of the vehicle is necessary so that the displacement of the oil pump acting as the pressure fluid source can be reduced.

(iii) In the aforementioned forward low speed range, torque is transmitted from the torque converter through the variable ratio rotation transmission mechanism to the output shaft. As a result, the kickdown effect is obtained to improve the responsiveness at the start of the vehicle by the torque amplifying action of the torque converter.

(iv) In the aforementioned forward low speed range, torque is transmitted from the torque converter through the variable ratio rotation transmission mechanism to the output shaft. As a result, the vehicle can run in the forward low speed range even if the CVT is disabled for some reason.

(v) The planetary gear mechanism of the aforementioned variable ratio rotation transmission mechanism is provided with the forward low speed range. As a result, starting after a stall condition in order to rapidly increase the converter oil temperature, for instance, by low temperatures, is easily accomplished.

(vi) In the forward high speed speed range of small reduction ratio of the planetary gear mechanism of the variable ratio rotation transmission mechanism, input torque is transmitted only partially through the CVT to the output shaft. This is advantageous in improving the reliability and service life of the pulley and belt of the CVT.

(vii) In the aforementioned forward high speed range, the input torque is transmitted partially through the CVT so that the torque transmission efficiency becomes high.

We claim:

1. A continuously variable transmission for a vehicle, comprising:
    a torque converter driven by an engine;
    an input shaft connected to an output of said torque converter;
    a transmission output shaft;
    a transmission mechanism of variable ratio including a planetary gear mechanism and a controller for controlling rotational states of elements of said planetary gear mechanism, said transmission mechanism having at least reverse and forward low speed ranges of large reduction ratios and a forward high speed range of small reduction ratio, said transmission mechanism of variable ratio being in torque transmitting engagement with said input shaft and said transmission output shaft, said input shaft constituting a first input to said transmission mechanism of variable ratio;
    a belt-type continuously variable transmission mechanism including an input pulley in torque transmitting engagement with said input shaft and an output pulley provided on a sleeve, each pulley having a stationary flange and a movable flange axially movable with respect to said stationary flange, and torque transmitting means of an endless belt type running on said two pulleys, said output pulley being coupled to said transmission output shaft via said planetary gear mechanism in said forward high speed range; and
    clutch means for providing releasable engagement between said sleeve of the output pulley of said belt-type continuously variable transmission mechanism and a second input to said transmission mechanism of variable ratio;
    wherein when said planetary gear mechanism of said transmission mechanism of variable ratio is in said forward high speed range of small reduction ratio, said clutch means is applied to enable said transmission mechanism of variable ratio to sum (1) a torque outputted to said output shaft via said transmission mechanism of variable ratio and (2) a torque outputted via said belt-type continuously variable transmission mechanism, whereas, when said planetary gear mechanism is in at least said forward low speed range of large reduction ratio, said clutch means is released to allow said sleeve of said output pulley to freely rotate with respect to said output shaft to thereby output only said torque outputted via said transmission mechanism of variable ratio.

2. The vehicular continuously variable transmission as set forth in claim 1, wherein said clutch means forms a part of said controller of said transmission mechanism of variable ratio.

3. The vehicular continuously variable transmission as set forth in claim 1, further comprising:
    a transmission mechanism of constant ratio provided between said input shaft and input pulley.

4. The vehicular continuously variable transmission as set forth in claim 3, further comprising:
    a further shaft provided parallel to said input and output shafts,
    said input shaft and output shaft being coaxially provided,
    said transmission mechanism of constant ratio being provided between said input shaft and said further shaft, and
    said input pulley of said belt-type continuously variable transmission mechanism being connected to said further shaft.

5. The vehicular continuously variable transmission as set forth in claim 4, wherein
    said transmission mechanism of variable ratio is provided between said input shaft and output shaft.

6. The vehicular continuously variable transmission as set forth in claim 3, wherein
    said output pulley of said belt-type continuously variable transmission mechanism is connectable to said output shaft through said rotation transmission mechanism of variable ratio.

7. The vehicular continuously variable transmission as set forth in claim 6, wherein
    one component of said transmission mechanism of variable ratio is connected to said input shaft.

8. The vehicular continuously variable transmission as set forth in claim 3, wherein
    said transmission mechanism of variable rati comprises a Ravegnaux-type planetary gear mechanism.

9. The vehicular continuously variable transmission as set forth in claim 3, wherein
    said transmission mechanism of variable ratio comprises a Simpson-type planetary gear mechanism.

10. The vehicular continuously variable transmission as set forth in claim 1, further comprising:
    a second shaft coaxial with said output shaft,
    said input shaft and output shaft being provided parallel to each other,
    said input pulley of said belt-type continuously variable transmission mechanism being provided on said input shaft,
    a transmission mechanism of constant ratio provided between said input shaft and second shaft, and
    said transmission mechanism of variable ratio being provided between said second shaft and output shaft.

11. The vehicular continuously variable transmission as set forth in claim 1, wherein said transmission mechanism of variable ratio comprises:
    a planetary gear mechanism comprising a sun gear connected to said output of said torque converter, a first set of planetary pinions borne rotatably on a carrier connected to said output shaft and meshing with said first sun gear, a second sun gear borne coaxial with said output shaft, a second set of planetary pinions borne rotatably on said carrier and meshing with said first set of planetary pinions and said second sun gear, and a ring gear meshing with said second set of planetary pinions; and
    said controller including (1) a first brake for braking said ring gear, (2) a second brake for braking said second sun gear through a one-way clutch, and (3)

said clutch means; said clutch means including a clutch for releasably connecting said second sun gear with said sleeve of said output pulley of said belt-type continuously variable transmission mechanism.

12. The vehicular continuously variable transmission as set forth in claim 1, wherein said transmission mechanism of variable ratio comprises:
a planetary gear mechanism comprising a first sun gear coaxial with said output shaft, a first set of planetary pinions borne rotatably on a first carrier connected to said output shaft, and meshing with said first sun gear, a first ring gear meshing with said first set of planetary pinions, a second sun gear rotating with said first sun gear, a second set of planetary pinions rotatably borne on a second carrier and meshing with said second sun gear, and a second ring gear connected to said output shaft and meshing with said second set of planetary pinions; and
said controller including (1) a first clutch for releasably connecting said first ring gear with said output of said torque converter, (2) said clutch means, said clutch means including a second clutch for releasably connecting said first sun gear and said second sun gear with said sleeve of the output pulley of said belt-type continuously variable transmission mechanism; and (3) a brake for braking said second carrier.

13. A continuously variable transmission for a vehicle, comprising:
a torque converter driven by an engine;
an input shaft connected to an output of said torque converter;
a transmission output shaft;
an intermediate shaft provided parallel to said input and output shafts;
a transmission mechanism of constant ratio provided between said input shaft and said intermediate shaft;
a transmission mechanism of variable ratio including a planetary gear mechanism and a controller for controlling rotational states of elements of said planetary gear mechanism, said transmission mechanism having at least reverse and forward low speed ranges of large reduction ratios and a forward high speed range of small reduction ratio, said transmission mechanism of variable ratio being in torque transmitting engagement with said input shaft and said transmission output shaft, said input shaft constituting a first input to said transmission mechanism of variable ratio;
a belt-type continuously variable transmission mechanism including an input pulley in torque transmitting engagement with said input shaft and an output pulley provided on a sleeve, each pulley having a stationary flange and a movable flange axially movable with respect to said stationary flange, and torque transmitting means of an endless belt type running on said two pulleys, said output pulley being coupled to said transmission output shaft via said planetary gear mechanism in said forward high speed range; and
clutch means for providing releasable engagement between said sleeve of the output pulley of said belt-type continuously variable transmission mechanism and a second input to said transmission mechanism of variable ratio;
wherein when said planetary gear mechanism of said transmission mechanism of variable ratio is in said forward high speed range of small reduction ratio, said clutch means is applied to enable said transmission mechanism of variable ratio to sum (1) a torque outputted to said output shaft transmission mechanism of variable ratio and (2) a torque outputted via said belt-type continuously variable transmission mechanism, whereas, when said planetary gear mechanism is in at least said forward low speed range of large reduction ratio, said clutch means is released to allow said sleeve of said output pulley to freely rotate with respect to said output shaft to thereby output only said torque outputted via said transmission mechanism of variable ratio.

* * * * *